(12) United States Patent
Higaki et al.

(10) Patent No.: US 7,447,840 B2
(45) Date of Patent: Nov. 4, 2008

(54) DISK ARRAY AND METHOD FOR READING/WRITING DATA FROM/INTO DISK UNIT

(75) Inventors: Seiichi Higaki, Odawara (JP); Yoshinori Okami, Odawara (JP); Takao Satoh, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/715,903

(22) Filed: Mar. 9, 2007

(65) Prior Publication Data

US 2007/0162696 A1 Jul. 12, 2007

Related U.S. Application Data

(63) Continuation of application No. 10/768,693, filed on Feb. 2, 2004, now Pat. No. 7,206,900, which is a continuation of application No. 10/457,387, filed on Jun. 10, 2003, now Pat. No. 6,757,782, which is a continuation of application No. 09/382,774, filed on Aug. 25, 1999, now Pat. No. 6,615,314.

(30) Foreign Application Priority Data

Jun. 9, 1999 (JP) ................................ 11-162042

(51) Int. Cl.
*G06F 12/16* (2006.01)
*G06F 11/00* (2006.01)
(52) U.S. Cl. .......................................... 711/114; 714/7
(58) Field of Classification Search ........................ None
See application file for complete search history.

(56) References Cited

U.S. PATENT DOCUMENTS

| 5,550,975 A | 8/1996 | Ichinomiya et al. | 714/51 |
| 5,566,316 A | 10/1996 | Fechner et al. | 711/114 |
| 5,611,069 A | 3/1997 | Matoba | 711/114 |
| 5,617,425 A | 4/1997 | Anderson | 714/5 |
| 5,737,745 A | 4/1998 | Matsumoto et al. | 711/114 |
| 5,826,046 A | 10/1998 | Nguyen et al. | 710/305 |
| 5,862,313 A | 1/1999 | Johnson et al. | 714/6 |
| 5,898,828 A | 4/1999 | Pignolet et al. | 714/6 |

(Continued)

FOREIGN PATENT DOCUMENTS

JP 7210333 8/1995

OTHER PUBLICATIONS

"Detailed Commentary of SCSI-2 (Latest SCSI Standard and Command Reference)", pp. 122-127.

*Primary Examiner*—Denise Tran
(74) *Attorney, Agent, or Firm*—Mattingly, Stanger, Malur & Brundidge, P.C.

(57) ABSTRACT

When a bus is used as a data communication channel, data within a disk unit cannot be reproduced or copied into a spare disk while a control unit is making read/write processing based on a request from a host computer, or vice versa. Thus, a loop is constructed by a fiber channel capable of time division multiplex function, and the processing between the disk unit and the spare is performed not through the control unit so that the data within the disk can be copied into the spare while the processing between the host computer and the disk unit is being performed, or both processing operations can be executed in parallel.

17 Claims, 15 Drawing Sheets

U.S. PATENT DOCUMENTS

| | | |
|---|---|---|
| 5,930,817 A | 7/1999 | Mizuno et al. ............... 711/114 |
| 6,148,414 A | 11/2000 | Brown et al. .................... 714/9 |
| 6,219,753 B1 * | 4/2001 | Richardson ................. 711/114 |
| 6,442,179 B2 | 8/2002 | Johnson ....................... 370/535 |
| 6,484,245 B1 | 11/2002 | Sanada et al. ............... 711/164 |
| 6,615,314 B1 | 9/2003 | Higaki ........................ 711/114 |
| 6,757,782 B2 | 6/2004 | Higaki et al. ................ 711/114 |
| 7,035,975 B2 | 4/2006 | Higaki et al. ................ 711/114 |
| 7,120,741 B2 | 10/2006 | Higaki et al. ................ 711/114 |
| 7,206,900 B2 * | 4/2007 | Higaki et al. ................ 711/114 |

* cited by examiner

DISK ARRAY AND METHOD FOR READING/WRITING DATA FROM/INTO DISK UNIT

The present application is a continuation of application Ser. No. 10/768,693, filed Feb. 2, 2004, now U.S. Pat. No. 7,206,900; which is a continuation of application Ser. No. 10/457,387, filed Jun. 10, 2003, now U.S. Pat. No. 6,757,782; which is a continuation of application Ser. No. 09/382,774, filed Aug. 25, 1999, now U.S. Pat. No. 6,615,314, the contents of which is incorporated herein by reference.

BACKGROUND OF THE INVENTION

The present invention relates to the control on a disk array, and particularly to a system for copying stored data in a disk unit into a spare disk when the disk unit constituting the disk array is closed or when the error frequency detected in the disk unit exceeds a given threshold.

The spare disk is disclosed in, for example, the invention of JP-A-7-210333. According to this gazette, when data in a disk unit where error occurs a certain number of times over a predetermined threshold is detected, or data in a broken-down and closed disk unit, is reproduced into or copied into a spare disk, it is required that the data in the closed or error-detected disk be once read and written in a control unit, and then read from the control unit and stored in the spare disk, because the control unit manages the reproduction/copy operation.

Therefore, when this processing begins, the resources such as a microprocessor or a memory provided on the control unit are used for the reading and writing operations, resulting in lack of resources to be assigned to the read/write processing that is performed at the same time on the basis of the request from a host computer. Thus, the read/write performance of the disk array is reduced. In addition, it took a longer time to write data into the spare disk.

When a disk unit constituting a disk array is closed or when the error frequency detected in the disk unit exceeds a given threshold, the data stored in the disk unit must be reproduced or copied into the spare disk.

These arithmetic reproduction processing and copying processing are required to be performed in parallel with the read/write processing based on the request from the host computer to the control unit. However, since the resources such as a microprocessor or a memory provided on the control unit are used for this copying processing, a small number of resources are assigned to the read/write processing that needs to be performed at the same time. Thus, the read/write performance of the disk array deteriorates.

SUMMARY OF THE INVENTION

It is an object of the present invention to provide a disk array with its read/write performance improved by decreasing the number of resources of the control unit used for these processing operations (as for data transfer, no resource will be used), and make use of such resources effectively for the read/write processing based on the request from the host computer.

DESCRIPTION OF THE EMBODIMENTS

Embodiments of the present invention will be described with reference to the drawings.

Figure 1:
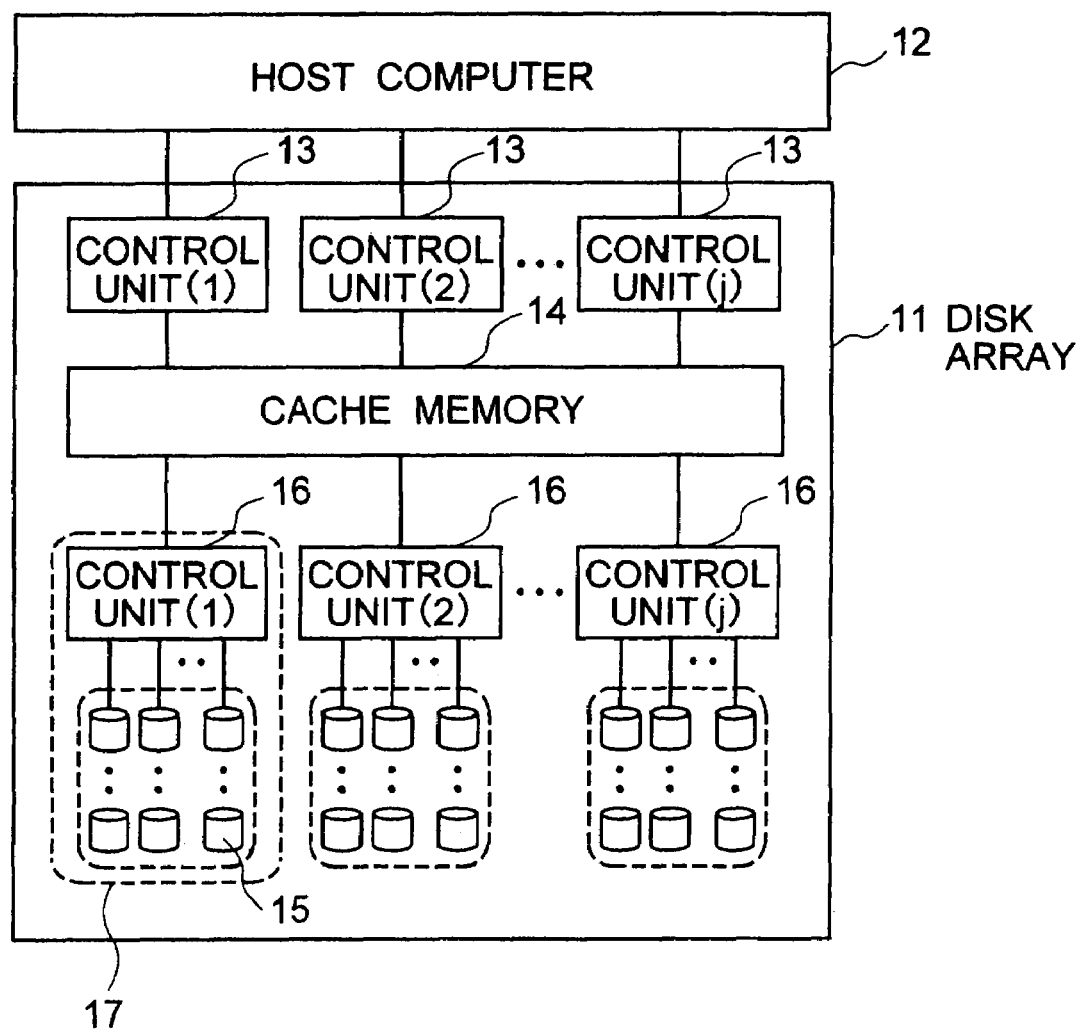
FIG. 1 is a block diagram of a disk array.
Figure 2:
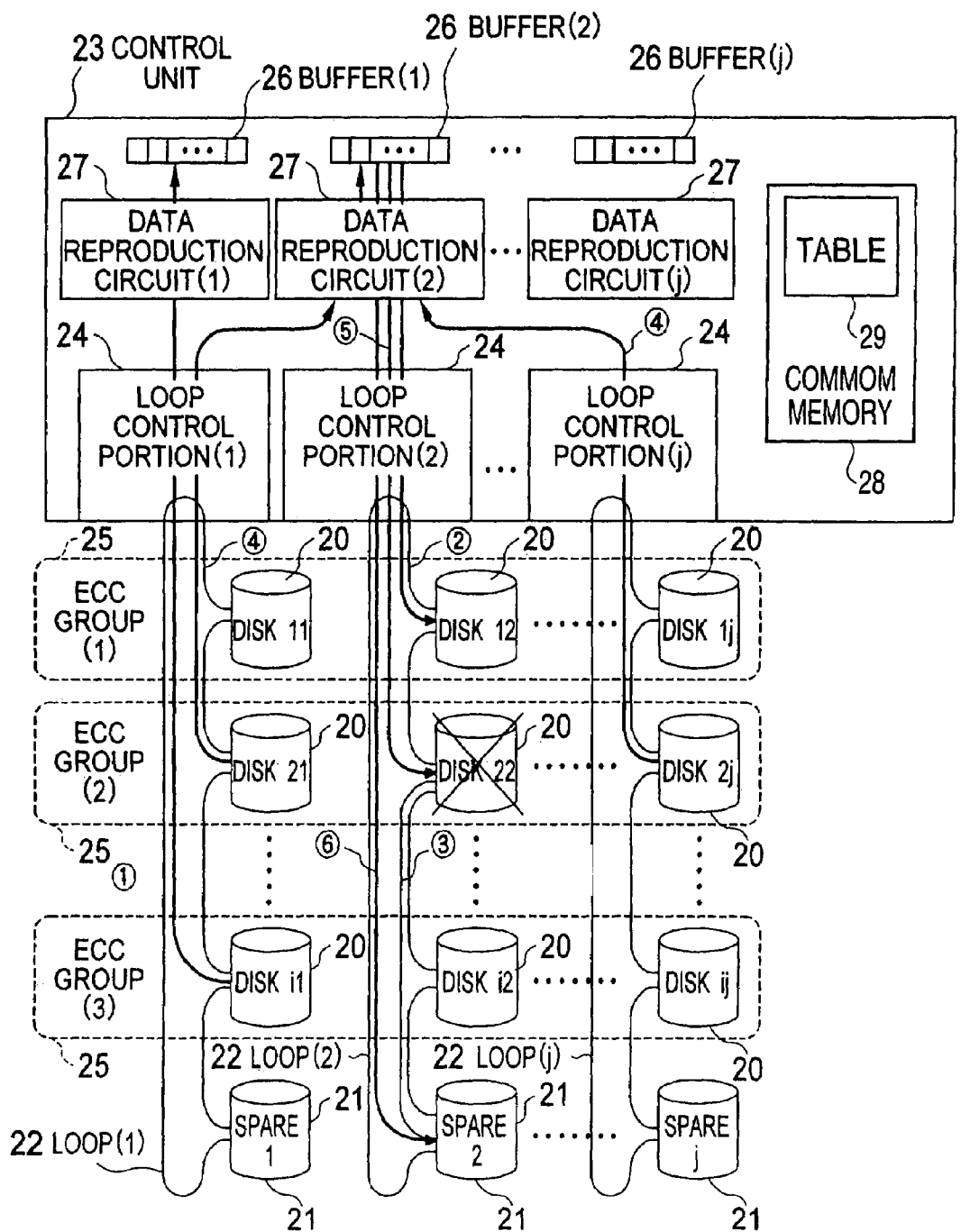
FIG. 2 is a diagram showing the connection and arrangement of disk units.

FIG. 1 shows an example of the construction of one embodiment of a disk array according to the present invention. There are shown a disk array 11, and a host computer 12 connected to the disk array 11. Data is supplied from the host computer 12 to the disk array 11 or vice versa through control units 13 that are provided in the disk array 11 on the host computer-12 side. The control units 13 are connected to control units 16 through a cache memory 14 for temporarily storing data transmitted between the host computer 12 and the disk array 11. The control units 16 constitute the disk array 11 and each control unit 16 controls a plurality of disk units 15. FIG. 2 shows the details of the control unit 16, disk units 15 and connections therebetween (the range enclosed by a dotted line 17).

Referring to FIG. 2, disk units 20 (disk 11~disk i1) and a spare disk unit 21 (spare 1) constituting the disk array are controlled through a loop 22 (loop 1) as a communication channel by a command transmitted from a loop control portion 24 (loop control portion 1) which will be described later. Disk 12 through disk ij and spare 2~spare j are similarly controlled through loops 22 by control portions 24 of the corresponding loops. In addition, the disk units 20 are provided with redundancy for improving the reliability against troubles.

The disk units 20 and spare disk units 21 shown in FIG. 2 have the same construction. The disk units 20 and loop control portions 24 have the same constructions as the disk units 15 and control units 16 shown in FIG. 1, respectively. Hereinafter, particular disks will be referred to as disks nm, or disks with numbers added, and general disks as disks 20. For spare disks, loops, ECC groups and loop control portions, reference numerals are also added to the corresponding names.

One of the examples of the command the loop control portion 24 transmits is a SCSI command operable on the loop 22. A SCSI protocol operable on the loop 22 will be used in the following description. The disk unit 20, when receiving a command, operates as a target, and also as an initiator depending on the kind (for example, copy command) of the command.

A plurality (i+1 in FIG. 2) of the disk units 20 are connected as a set by a single loop 22 to each loop control portion 24 of the control unit 23. The data transfer speed of this loop 22 is higher than that of a single disk unit 20. In addition, the loop 22 enables a plurality of simultaneous communications to be performed between the paired disk unit and loop control portion and between the paired disk unit and disk unit by transferring data of frame units in a time sharing manner. Thus to make this communication possible, the loop 22 is formed of, for example, a fiber channel.

The control unit 23 has a plurality of loop control portions 24 (j loop control portions in FIG. 2). Therefore, a single control unit 23 has a plurality of loops 22 connected. In addition, the plurality of loop control portions 24 are able to communicate with each other. This mutual communication can be attained by the transmission of data between the loop control portions 24 through a common bus (not shown), for example.

Each loop 22 is connected to at least one spare disk unit 21 (hereinafter, referred to as spare disk). The spare disk 21 is different from the other disk units 20 connected to the same loop 22 in that it usually does not store the data from the host computer (see FIG. 1). When the error frequency exceeds a given threshold in one of the disk units 20 of the same loop 22, or when one of the disk units 20 of the same loop 22 breaks down and is closed, the data within that disk unit 20 is copied into the spare disk 21. Then, the spare disk 21 replaces that disk unit 20 according to the process described below.

TABLE 1

| LOOP ID | DISK UNIT ID | ERROR COUNT | STATUS |
|---------|--------------|-------------|--------|
|         |              |             |        |
|         |              |             |        |
|         |              |             |        |
|         |              |             |        |
|         |              |             |        |
|         |              |             |        |
|         |              |             |        |
|         |              |             |        |

A disk management table shown in Table 1 illustrated in the drawings as Table 29 is provided on a common memory 28 of each loop control portion 24 which the control unit 23 has. This table has an entry provided for each disk unit 20. At each entry there are the identifier (loop ID) of the loop 22 connected to the disk units 20, the identifier (disk unit ID) of the disk unit 20, the number of error (error count) the disk unit 20 causes, and the status field of the disk unit 20. This table can be accessed from each loop control portion on the control unit 23.

At each loop control portion 24 the two different kinds of jobs are performed as given below. One of the jobs is based on the flow shown in FIG. 3. That is, data within the disk unit 20, where the error frequency has exceeded a given threshold, is copied into the spare disk 21 connected to the same loop 22. The other one is based on the flow shown in FIG. 4. That is, the read/write processing of data is performed between a certain loop control portion 24 and the disk unit 20 connected to the loop control portion 24 through loop 22. In one loop control portion 24, one former job and a plurality of the other latter jobs are performed at a time (in parallel).

As described above, the data transfer speed of loop 22 is much higher than that of one disk unit 20, so the loop is able to transfer data by time sharing. Therefore, data can be transferred between the control unit 23 and the plurality of disk units 20, and also between the disk units 20 at a time. Thus, a plurality of jobs can be performed at a time.

The job of writing data into the spare disk 21 will be described with reference to FIG. 2 and the flowchart of FIG. 3.

Suppose that the error frequency at disk 22 has exceeded the threshold and was detected by this job. Then, as will be described later, a flag is raised in the status field assigned to the disk 22 at an entry of the disk management table. The data in the disk 22 is copied into the spare 2 connected to the same loop 2. When the disk array 11 starts to operate, the loop control portion 2 serving as an initiator to the disk 22 causes the job to start processing (step 3-1).

Then, the job searches for the disk management table shown in Table 1, looking for a disk unit 20 of which the data is to be copied into the spare disk 21 (step 3-2). This searching operation is made by referring to the status fields of the disk units 20 at the entries of the disk management table. If there is a disk unit 20 where error occurs and is detected a certain number of times over a threshold, a flag indicating to copy data into the spare disk 21 is raised in the status field assigned to the disk 22 at the corresponding entry of the disk management table as will be described later. Then, at step 3-3, if there is a disk unit 20 of which the data is to be copied, the program goes to the next step. If not so, the job repeatedly continues the processing from step 3-1.

If there is a disk unit of which the data is to be copied (in this case, disk 22), the loop control portion 2 transmits a command to copy data of disk 22 through the loop 2 to the spare disk 2 that is connected to the loop 2 (step 3-4). This command may be a SCSI copy command. The SCSI command, though not described here in detail since it is given in the general standards, can be referred to, for example, "Detailed Commentary of SCSI-2 (Latest SCSI standards and Command Reference)", written by Seiichi Sugaya, and published by CQ, pp. 122-127.

At this time, the loop control portion 2 and spare disk 2 are in a relation of initiator and target. The parameters of the command to be transmitted are the identifier of disk 22, the address of logic block head from which data is started to transfer, and the length of data to be transferred at a time. The data specified by the command is transmitted not through the loop control portion 2 but through loop 2 from the disk 22 to the spare disk 2 (indicated by ③).

Then, to transfer the remaining data of disk 22, the loop control portion 2 updates the variable holding the start logic block address of data transfer (step 3-5). Thereafter, the processing is repeated until all data of the disk unit where error occurs and is detected a certain number of times over a threshold are completely copied (step 3-6). When all data of the disk 22 has been completely transferred, the job assigns the identifier of the disk 22 to the spare 2, and closes the disk 22 (step 3-7).

By doing so, the spare 2 starts to operate in place of the disk 22 which the error frequency has exceeded the threshold. In other words, the spare 2 by which the disk 22 is replaced is treated as disk 22 by the initiator (loop control portion 2) since it has the same identifier as the disk 22. The loop control portion 2 finally stops the job (step 3-8).

Figure 4:
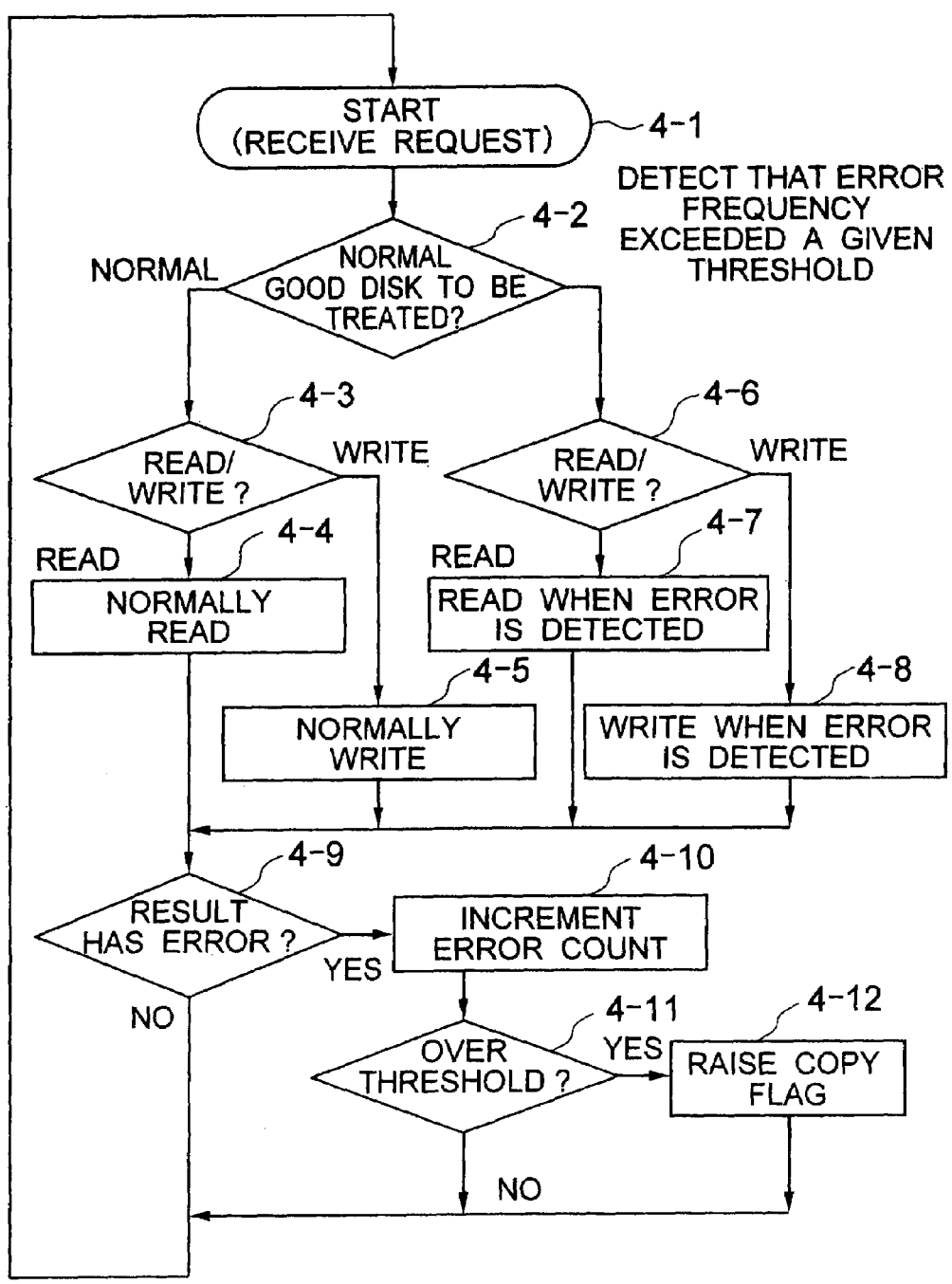
FIG. 4 is a flowchart for reading/writing of data into a disk unit.

The job of read/write processing of data with respect to the disk unit will be described with reference to FIG. 2 and the flowchart of FIG. 4. This job orders the loop control portion 24 to read/write data from/into the disk unit 20 that is connected through loop 22 to the loop control portion.

This job makes multiple operations within the loop control portion 24 that serves as an initiator with respect to the disk unit 20.

First, when a request for the job occurs from the host computer 12, a request of reading/writing data from/into disk unit 20 is issued (step 4-1). The job decides if the request is with respect to the normal disk unit 20 or the disk unit 20 where error occurs and is detected a certain number of times over a threshold (in this case, disk 22 the data of which is being copied into spare 2) (step 4-2).

This decision operation is performed by referring to the disk management table (Table 1) which the control unit 23 has, and looking for the status field of the disk unit 20 of which the identifier serves as a key for the search. A flag indicating that data is copied into spare 2 is raised in the status field of the disk 22 where error occurs and is detected a certain number of times over a threshold.

In the first case, disk 20 which accepts the request is operating normally (referred to as disk (i1)).

The job decides if the request is reading or writing of data (step 4-3). If the request is reading of data, the job makes usual reading processing (step 4-4). When the request is to read data from disk i1 the job transmits a data read command to the disk i1 through loop 1. The disk i1 transfers data through loop 1 to a buffer 26 of loop control portion 24 as indicated by ①.

If the request is writing of data, the job makes usual writing processing (step 4-5). When data is to be written in the disk 12, the job transmits a data write command to the disk 12 through the loop 2. Then, the buffer 2 of the loop control portion 2 transfers data through loop 2 to the disk 12 as indicated by ②. In either reading or writing case, the loop control portion 1 and disk i1 are in a relation of initiator and target, and so are the loop control portion 2 and disk 12.

In the second case, the error frequency detected at disk 20 has exceeded the threshold (referred as disk (22)).

The job for this case first decides if the request is reading or writing of data (step 4-6). If the request is reading of data, the job makes reading processing at the time of error detection (step 4-7).

When the request is writing of data, the job makes writing processing at the time of error detection (step 4-8).

Then, the job receives from the disk unit the results of execution after treating the read request and write request, and confirms if the result is successful or occurrence of error (step 4-9). If no error occurs, the job goes back to step 4-1 in order to receive the next request as described previously. If error has occurred, the job increments the value of error count of the entry having the disk identifier on the disk management table shown in Table 1 (step 4-10).

Then, the job decides if the incremented result exceeds a predetermined threshold (4-11). If it does not exceed the threshold, the job goes back to step 4-1 in order to receive the next request.

If it exceeds the threshold, a flag indicating that data should be copied into spare 2 is raised in the status field of the entry having the identifier of the disk 22 on the disk management table (step 4-12). Then, the job goes back to step 4-1.

Thus, the job can know from the disk management table that the error frequency has exceeded the threshold at the disk 22 from which data is to be read. At this time, the job never transmits a command to the disk 22. Instead, the job, making use of the function of communication between the loop control portions 24, orders the loop control portions 1~j except loop control portion 2 to read data in order that the requested data can be obtained by ECC operation.

The loop control portions which the job ordered send a command to the other disk 21, and so on of the ECC group 2 to which the disk 22 belongs, thereby reading on the command the data that is required in order that the data the job tries to read from the disk 22 can be reproduced by ECC operation. The disk 21 and so on of the loops that received this command transfer the requested data to the loop control portion 1. The loop control portion 1 transfers this data to the data reproduction circuit 2.

Similarly, data of the disks belonging to the ECC group 2 are sent from the other loop control portions to the data reproduction circuit 2 (as indicated by ④). The data reproduction circuit 2 responds to these received data to make ECC operation on the data which the loop control portion 2 first tried to read from the disk 22, thereby reproducing that data. Then, the reproduced data is supplied to the buffer 2.

When the request is writing of data, the job makes writing processing at the time of error detection. A description will be made of the case where a request to write data is issued to the disk 22 in which error occurs and is detected a certain number of times over a threshold and of which the data is being copied into the spare 2.

Figure 3:
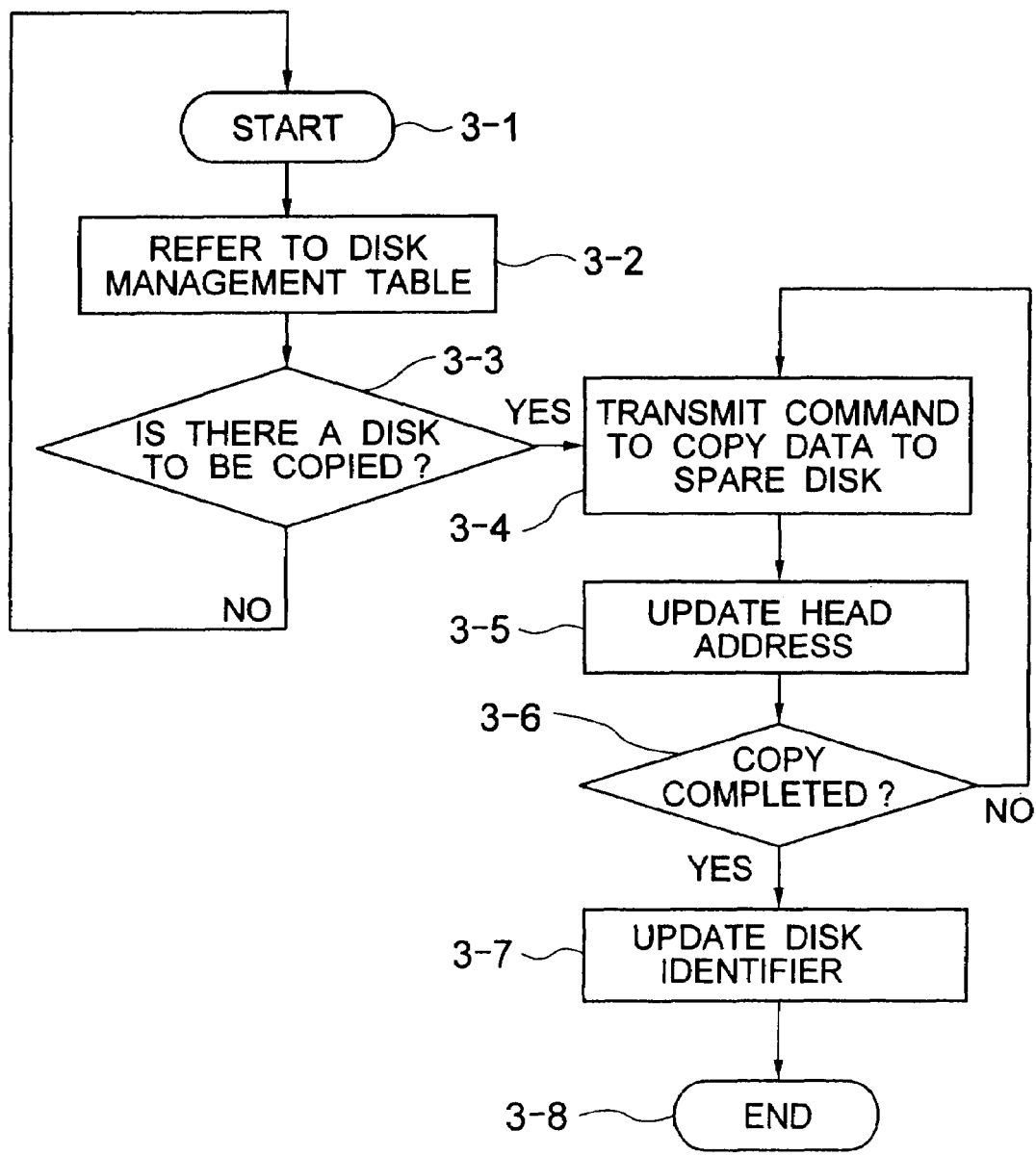
FIG. 3 is a flowchart for writing of data into a spare disk.

The data of the disk 22 is copied into the spare 2 sequentially from the head logic address of disk 22 according to the job that executes the flow shown in FIG. 3 on the loop control portion 2. The variable which the job uses can let us know to which address the copying operation has been advanced in disk 22. When part of the data to be copied into spare disk 2 remains on addresses in which another data is to be written according to the write request, the job for treating this write request transmits a data write command to the disk 22. Then, the buffer 2 of the loop control portion 2 transfers data through loop 2 to the disk 22 (as indicated by ⑤).

The written data is copied from the disk 22 into the spare 2 according to the job that later executes the flow shown in FIG. 3. When the data in the addresses of disk 22 in which data is to be written according to the write request has been copied into spare 2, the job to treat this write request transmits a data write command to the spare disk 2. Then, the buffer 2 of loop control portion 2 transfers data through loop 2 to spare 2 (as indicated by ⑥).

Figure 5:
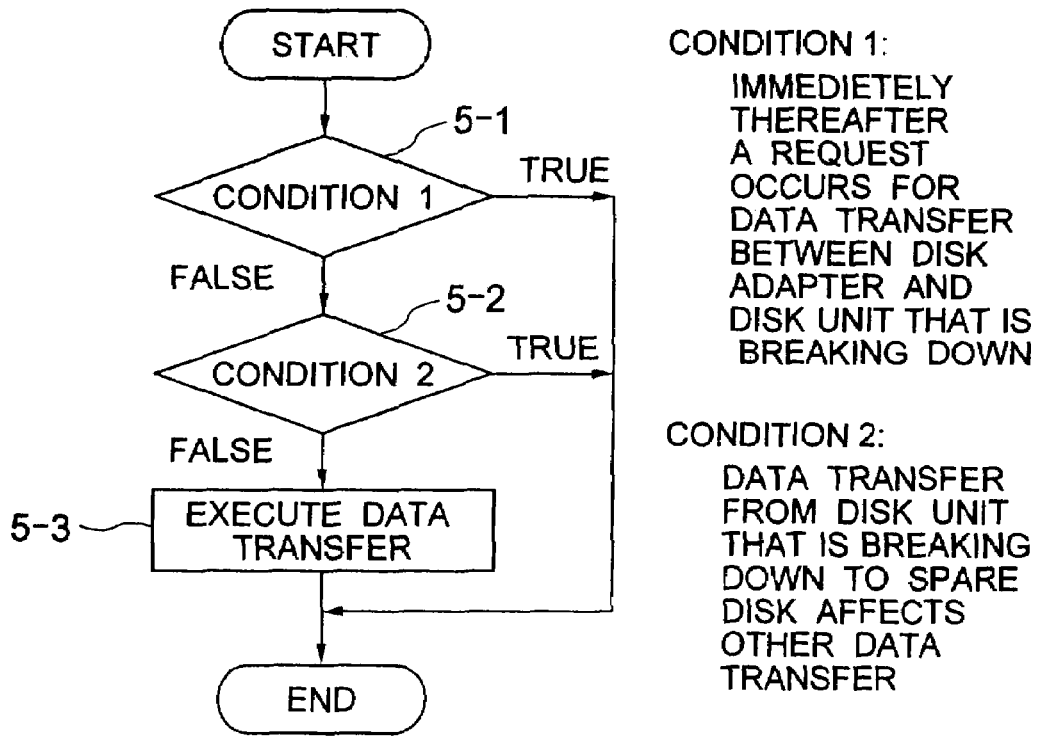
FIG. 5 is a flowchart for data transfer start logic by a job on a loop control portion.

When data is started to transfer to spare 2 from disk 22 where the error has exceeded the threshold, the job that executes the flow shown in FIG. 3 can make use of the logic shown in FIG. 5 together with a table such as Table 1 and an equation such as expression 1 which will be given later.

In other words, steps 5-1 and 5-2 can be added before step 3-4. (Step 5-3 corresponds to steps 3-4 and 3-5.) Each entry of Table 1 includes the data transfer processing that is under execution on the loop 22 and the data transfer processing that is about to be executed except the data transfer to spare 2 from the disk 22 where error occurs and is detected a certain number of times over a threshold. Each entry has necessary parameters provided for data transfer between control unit 23 and disk unit 20. The job searches for the disk unit identifier in Table 2 and decides if there is a request for data transfer between loop control portion 2 and disk 22 where error occurs and is detected a certain number of times over a threshold (step 5-1).

TABLE 2

| DISK UNIT ID | STATE OF EXECUTION | CONMAND | HEAD ADDRESS | NUMBER OF TRANS-FERRED BLOCKS | RESULT OF EXECUTION |
|---|---|---|---|---|---|
| 1 | UNDER EXECUTION | | | | |
| 2 | UNDER EXECUTION | | | | |
| 3 | UNDER EXECUTION | | | | |
| 4 | | | | | |
| or -1 | | | | | |
| or | | | | | |

If there is the request, or if the decision is true, the data transfer to spare 2 is not performed, and data transfer between loop control portion 2 and disk 22 takes priority. If there is no request, or if the decision is false, decision is made of whether loop 2 leaves much data transfer ability or not (step 5-2). When data transfer is made between the disk 22 and spare 2, the loop 2 has a load. This examines if the other data transfer operations are affected. The job searches for items of state of execution in Table 1, and finds the number of data transfer operations under execution. After finding the number of data transfer operations, the job employs the following equation (1)

$$\{\text{Data transfer speed of loop}-(\text{data transfer speed of a single disk unit})\times(\text{number of data transfer operations under execution between disk adaptor and disk unit}+1)\} \quad (1)$$

This equation is used to decide if the loop 2 still leaves data transfer ability enough to make data transfer from disk 22 to spare 2 after subtraction of unit transfer speed multiplied by data transfer number from the data transfer speed of loop 22. If the value of the equation (1) is positive (the decision of step 5-2 is false), or if it is decided that the loop 2 leaves much data transfer ability, data transfer is started from disk 22 to spare 2 (step 5-3).

Figure 6:
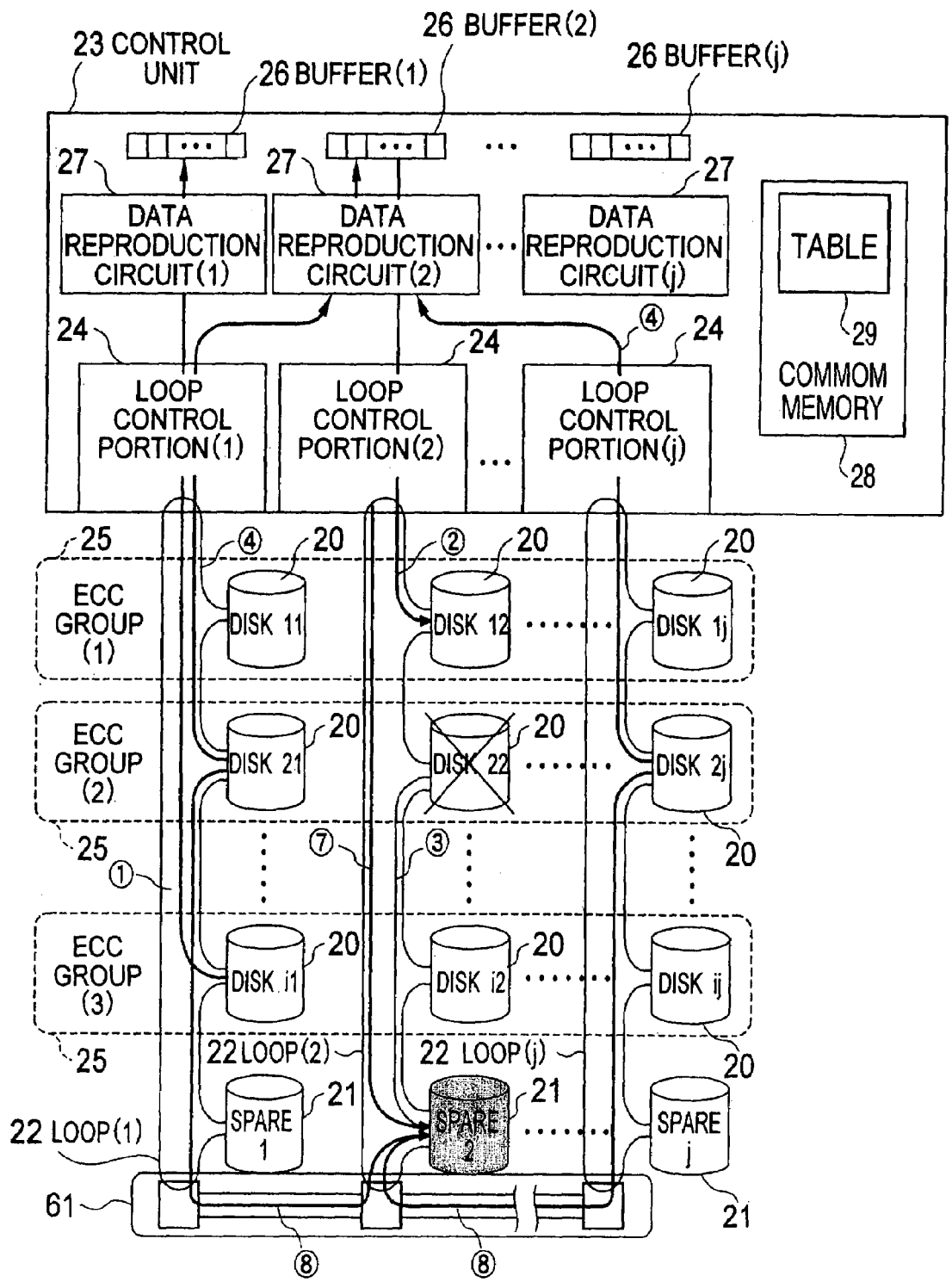
FIG. 6 is a diagram showing the connection and arrangement of the disk units.

If the value of equation (1) is negative, or if the loop does not leave much ability (decision of step 5-2 is true), data transfer is not made from disk 22 to spare 2. The job repeatedly executes this logic before a data transfer command is transmitted to the spare disk 2, because the read/write request with respect to disk 20 from the host computer 12 is desired to be given priority over the copy of data into spare 2. The second embodiment of the invention will be described. In this embodiment, the part within a frame 17 shown in FIG. 1 takes a connection of disk units as illustrated in FIG. 6. This construction is different from that shown in FIG. 2 in that a switch 61 is added and that the function of each disk unit 20 is expanded.

The switch 61 acts to interconnect a plurality of loops 22. Thus, the loop control portion 24 or disk 20 connected to a certain loop 22 can be communicated with the loop control portion 24 or disk 20 of another loop 22. Before making mention of the construction of switch 61, a description will be made of a frame that is transmitted when the loop control portion 24 or disk 20 communicates with others through loop 22.

Figure 7:
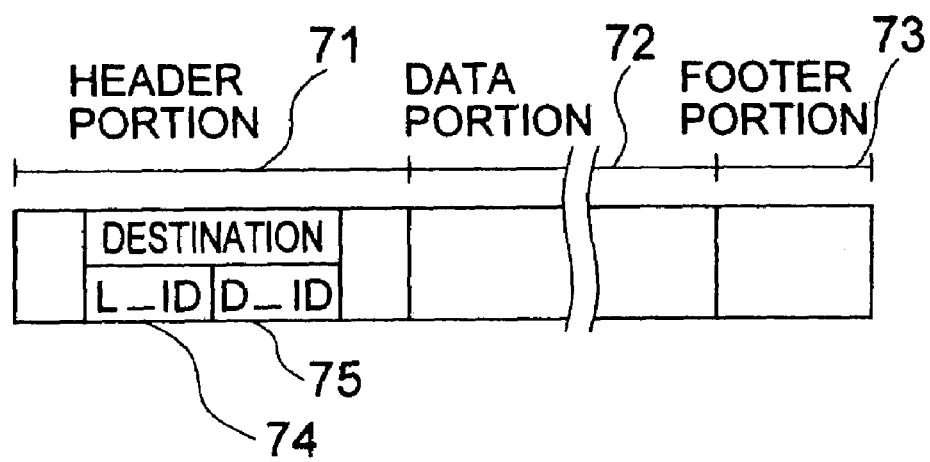
FIG. 7 is a diagram showing the format of a frame.

FIG. 7 shows the format of the frame. The frame has three different portions of a header portion 71, data portion 72 and footer portion 73. The header portion 71 includes information of frame's destination. The destination information is formed of two components; a loop identifier 74 (L_ID) and a disk unit identifier 75 (D_ID). The loop identifier 74 is the identifier of loop 22 having disk unit 20 connected at the frame's destination. The disk unit identifier 75 is the identifier of disk unit within a loop at the destination.

Data is divided into units of predetermined amount because of time division multiplex communication. In addition, since the fiber channel transfers data at a much higher speed, the data transfer within loop 22 is made through a predetermined slot for communication only between a host unit and disk unit 20 (including spare disk 21), and through a predetermined slot for communication only between disk units 20 (chiefly between disk unit 20 and spare disk 21). However, the slots for communication only are not necessarily provided if the amount of data transfer to spare disk 21 from disk unit 20 where error occurs and is detected a certain number of times over a threshold can be automatically adjusted in such a manner that data transfer speed is not reduced between normal disk unit 20 and control unit 23 while the traffic on the loop 22 is being monitored.

Figure 8:
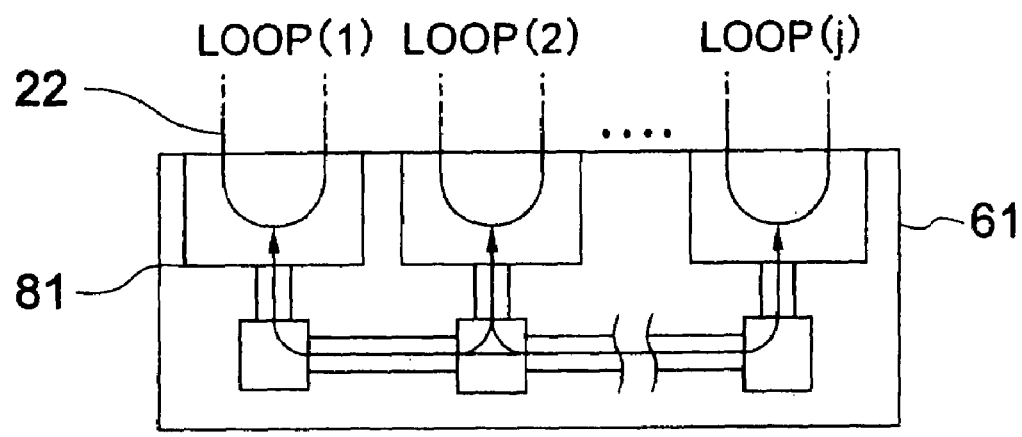
FIG. 8 is a diagram showing the construction of a switch.

FIG. 8 shows an example of the construction of the switch 61. The switch 61 has loop connectors 81 (j connectors in FIG. 6) the number of which corresponds to the number of loops (for example, loop 1) to be connected. The loop connectors 81 are interconnected so that they can transmit data to each other or communicate with each other.

Figure 9:
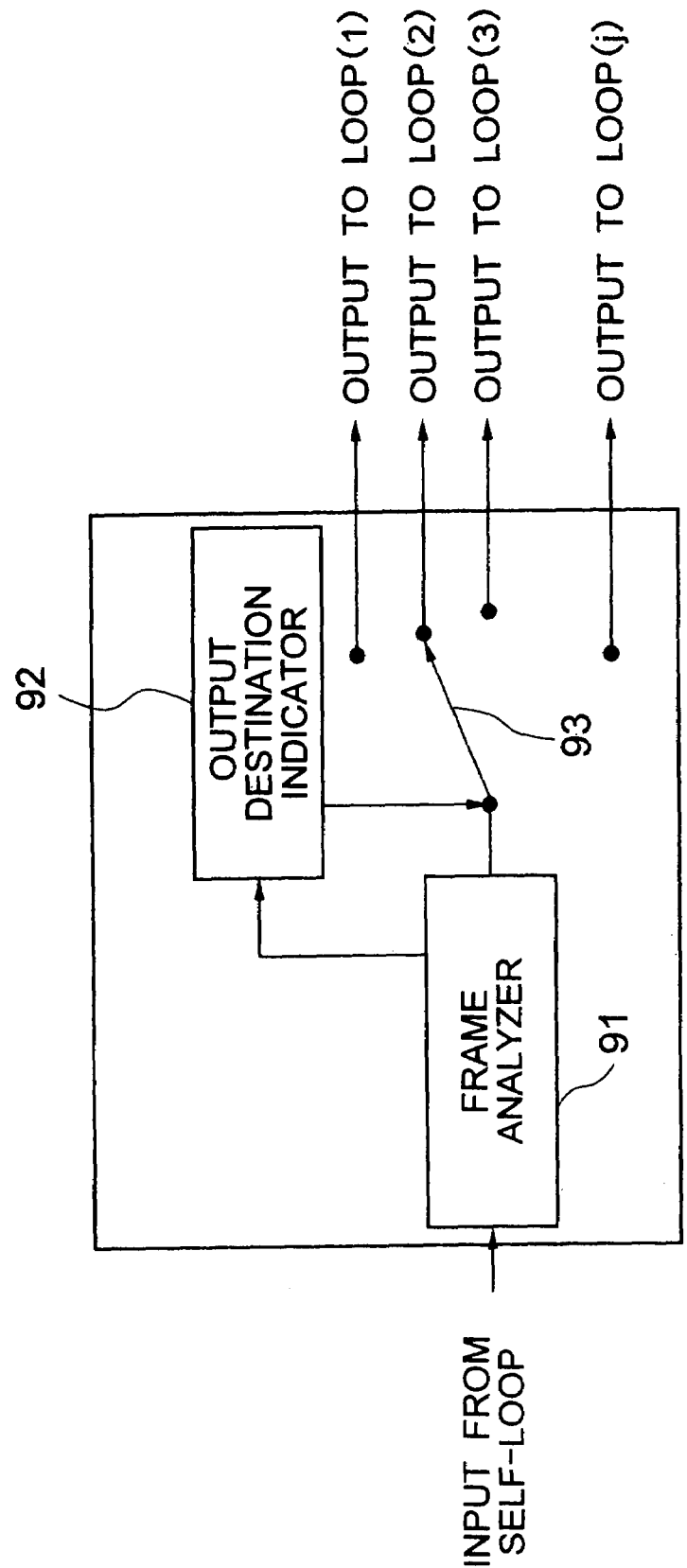
FIG. 9 is a block diagram of a loop connection.

FIG. 9 is a block diagram of the loop connector 81. When a frame is supplied to the loop connector 81 from a loop (self-loop) connected to the connector 81, the frame is first sent to a frame analyzer 91, where the information of header portion 71 shown in FIG. 7 is referred to. Then, an output destination indicator 92 shows the destination of the frame according to the value of the loop identifier 74 of the header portion 71, making switching operation. As a result, the corresponding frame is supplied to the destination loop. Thus, communication is possible over loops 22.

The latter expanded function of disk unit 20 will be described. Since the disk units 20 constituting the disk array 11 supposed in the first embodiment can treat the SCSI protocol that is operable on the loop, they can normally operate as a SCSI target, and in some case operate as an initiator.

The disk units 20 in the second embodiment have not only the function assumed in the first embodiment but also a function to apply information about another plurality of disk units 20 of a certain ECC group, read data from those disk units 20, and calculate ECC, thereby reproducing data. The details of the operation will be described below.

In the second embodiment, two kinds of jobs are performed in each loop control portion 24 as in the first embodiment. One job is based on the flowchart of FIG. 10. In other words, the data of a closed disk unit 20 is reproduced in the spare disk 21 or the data of a disk unit where error occurs and is detected a certain number of times over a threshold is copied into the spare disk 21.

Figure 12:
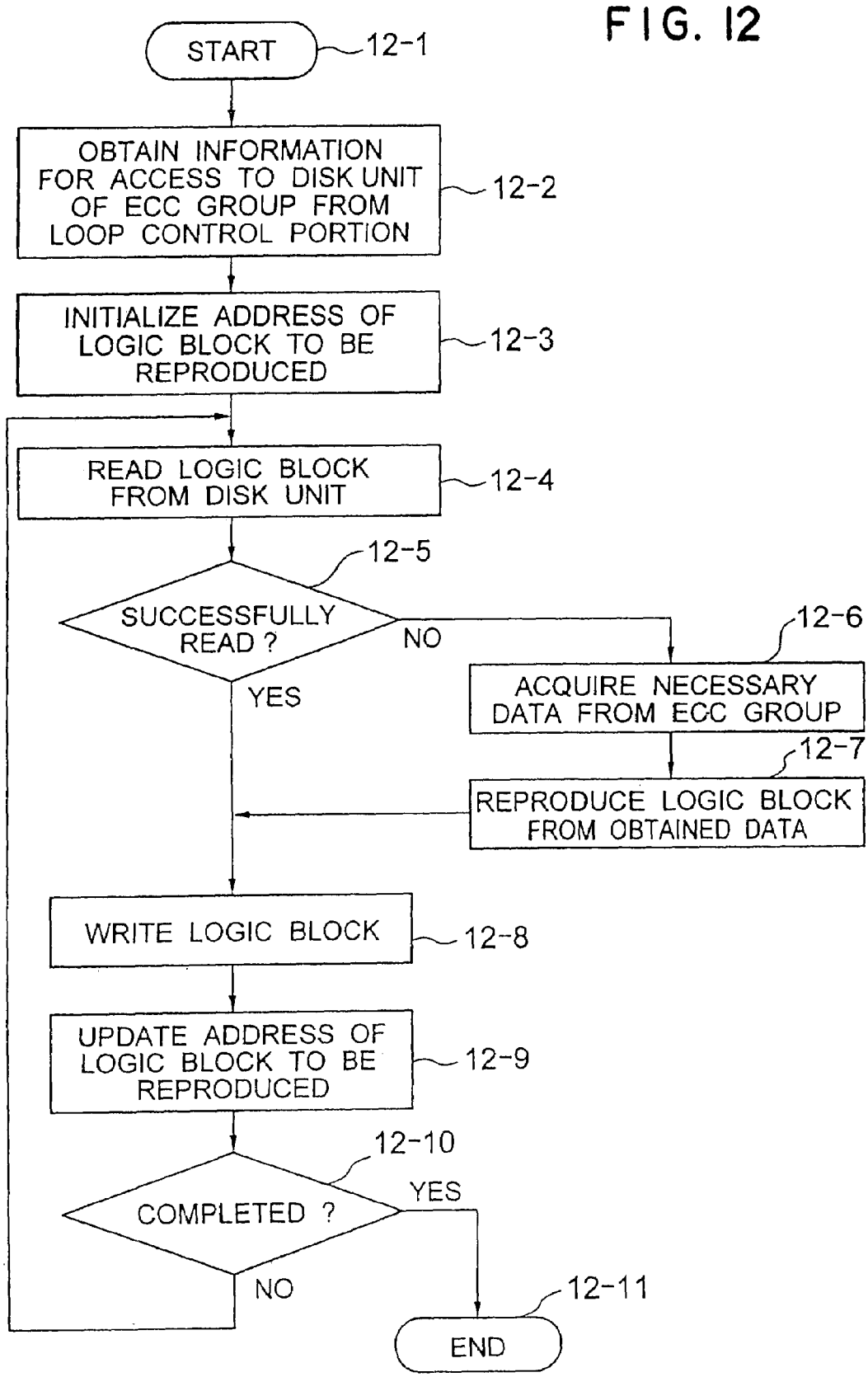
FIG. 12 is a flowchart for copy processing from disk unit.

The other job is based on the flowchart of FIG. 12. In other words, data is read/written between a certain loop control portion 24 and a disk unit 20 connected to that loop control portion 24 through loop 22. In addition, one former job and a plurality of latter jobs are performed at a time within one loop control portion 24 as in the first embodiment.

Figure 10:
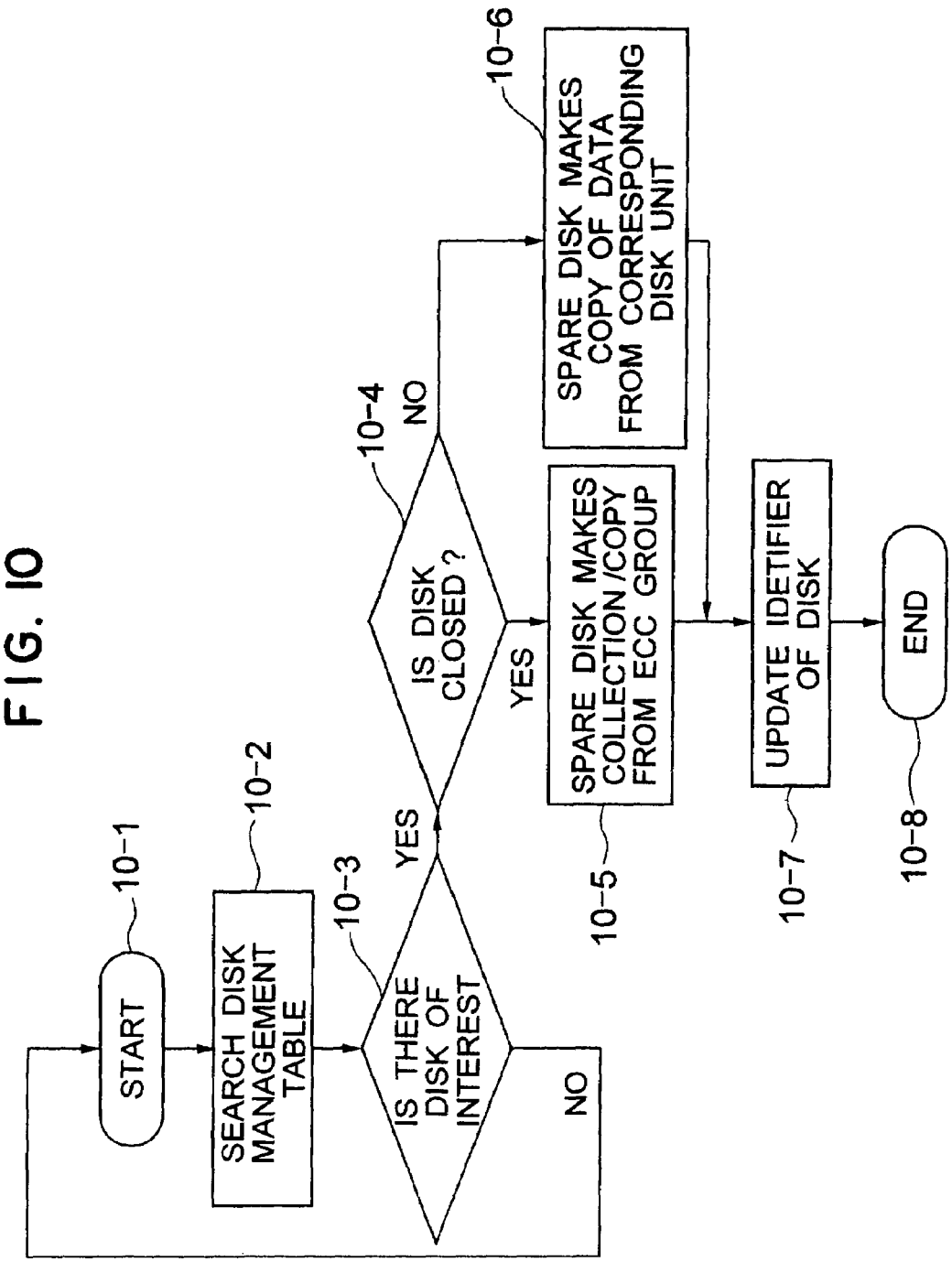
FIG. 10 is a flowchart for copy start instruction.

The former job will be first described with reference to the flow of FIG. 10. When the disk array 11 starts, the job also starts processing (step 10-1). First, the job searches the disk management table shown in Table 1 (step 10-2).

The job decides if data is required to be written in spare disk 21 according to the value of the status field (step 10-3). In this embodiment, too, the value indicating the state of disk unit 20 is set in the status field. For example, when the disk 20 is closed, or when error occurs and is detected in disk unit 20 a certain number of times over a threshold, a flag is raised, reflecting each case.

A disk unit 20 of interest is found and data of the disk unit is required to be written in spare disk 21 when (1) a disk unit is closed, or when (2) error occurs and is detected in a disk unit a certain number of times over a threshold.

If the state of disk unit 20 is found to satisfy neither of the two conditions from the result of having referred to the disk management table shown in Table 1, the job repeats the processing from step 10-1. If either condition is satisfied (there is a disk unit of which the data is to be copied), the job goes to the next step (step 10-3).

If the state of a disk unit satisfies either one of the two conditions, the job decides if the disk is closed or not in order to determine the data to be copied into the spare disk (step 10-4).

When a disk unit 20 is closed, the job transmits a command to the spare disk so that data can be collected from another normal disk unit 20 of the ECC group belonging to that disk unit 20, and that ECC operation can be made to reproduce the data within the closed disk unit 20. The command-received spare disk 21 performs a necessary processing for copy (step 10-5). When there is a disk unit 20 where the error frequency has exceeded the threshold, the job transmits a command to the spare disk 21 so that the data within that disk unit can be copied into the spare disk 21. The command-received spare disk 21 makes a necessary processing for the copy (step 10-6).

When the spare disk 21 receives the command, the loop control portion 24 in which the job has started functions as an initiator, and the spare disk 21 functions as a target. When the spare disk 21 makes the above processing after receiving the command, the spare disk 21 acts as an initiator, and the disk unit 20 communicating with the spare disk 21 acts as a target. After the data within the closed disk unit 20 has been completely reproduced within the spare disk 21 by the ECC operation or the data of the disk unit where error occurs and is detected a certain number of times over a threshold has been completely copied into the spare disk, the job updates the identifier to the spare disk as described in the first embodiment (step 10-7).

Thereafter, the spare disk 21 behaves as the closed disk unit 20 or the disk unit 20 where error occurs and is detected a certain number of times over a threshold. Then, the job ends (step 10-8).

Figure 11:
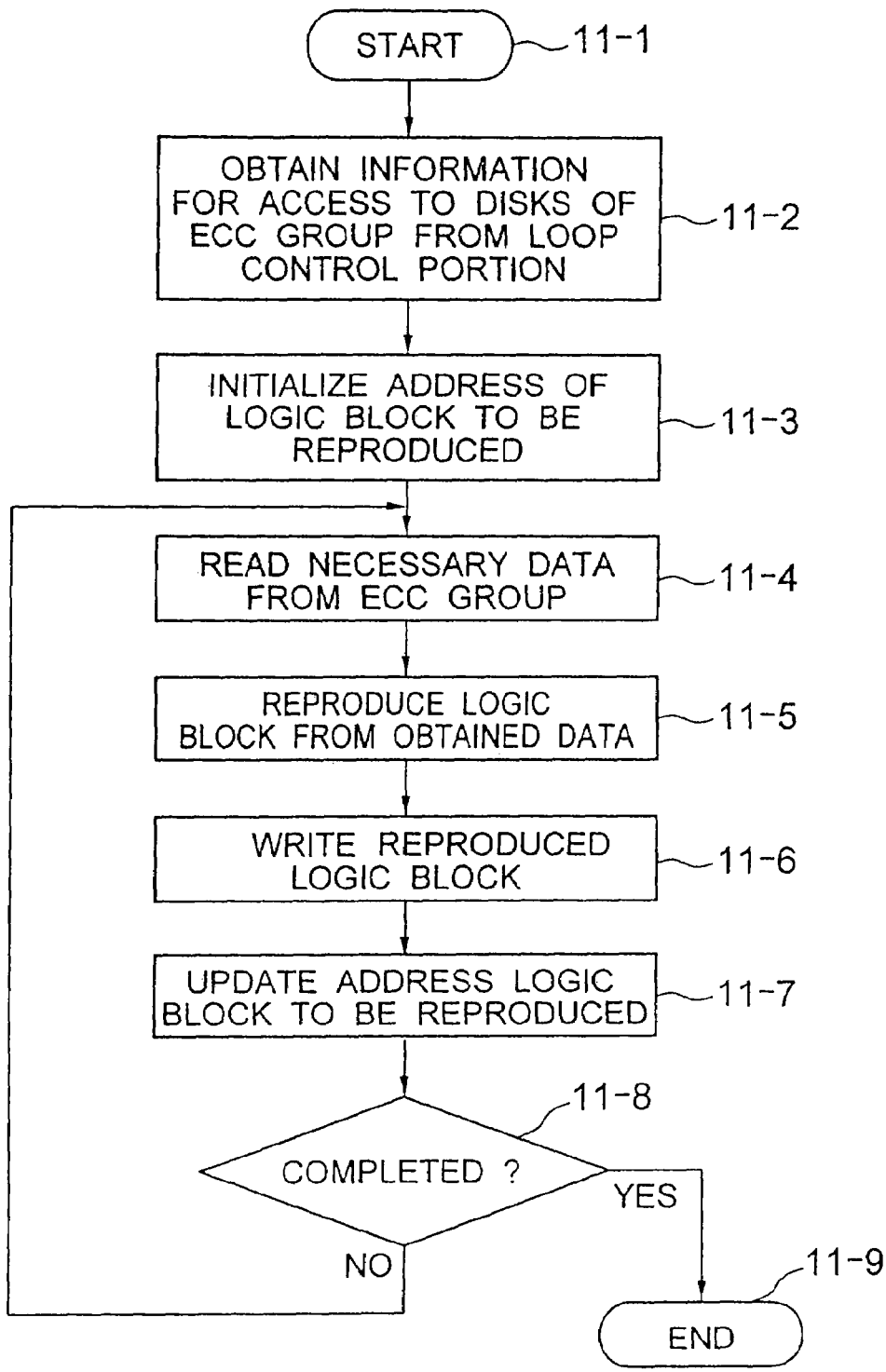
FIG. 11 is a flowchart for spare disk processing to be performed when data is reproduced from ECC group.

The flow of the processing for the case of the closed disk unit will be described in detail with reference to FIG. 6 and the flowchart of FIG. 11. FIG. 10 6 shows the flow of data when the data within the closed disk unit is reproduced by ECC operation, and FIG. 11 is a flowchart for the processing which the spare disk 21 makes when receiving the command from the loop control portion 24.

When the disk 22 is closed, the loop control portion 2 transmits a command through loop 2 to the spare disk 2 that is connected to the loop 2 connected to the closed disk 22 so that the data within the closed disk 22 is reproduced by ECC operation, and written in the spare 2 (as indicated by ⑦). The spare 2 that received this command starts the processing shown in FIG. 11 (step 11-1).

The spare 2, when receiving the command from the job within the loop control portion 2, also receives as a parameter information about a plurality of normal disks (21) that belong to the ECC group 2 of the closed disk 22 (step 11-2). This information includes the identifiers-of-normal disks (21) and the identifier of the loops (1) to which these disk units (21) belong.

When the command is received, the loop control portion 2 and spare 2 are in a relation of initiator and target. After receiving the command, but before the command is started be executed the spare 2 becomes an initiator to the normal disks (21). On the other hand, the normal disks 21 . . . 2j become targets relative to the spare 2. Then, the spare 2 initializes the value of the address of the logic block that is stored after reproduction by ECC operation (step 11-3).

Then, the spare 2 transmits a read command to the other disk 21, disk 2j that belong to the ECC group 2, so that necessary data is read out for ECC operation and reproduction of the logic block on the closed disk 22 (step 11-4). In that case, the transfer of the data of disk 21 is made not through the loop control portion 1 and loop control portion 2 but through switch 61 directly to spare 2 over the two loops 1, 2 (as indicated by ⑧). At this time, the spare 2 and the normal disks (21) that belong to ECC group 2 are in a relation of initiator and target. The transfer of the data of disk 2j is performed in the same way.

The spare 2 identifies a normal disk (21) to be specified by use of the loop identifier and disk unit identifier obtained at step 11-2 in order-that necessary data can be read therefrom for ECC operation and logic block reproduction. In addition, the spare 2 makes ECC operation by use of data similarly read from the normal disks 21, 2j that belong to ECC group 2, thus reproducing the data stored in the logic block on the closed disk 22 (step 11-5).

Moreover, the spare 2 writes the reproduced data in its own logic block (step 11-6). Then, the spare 2 updates the address of this logic block in order to reproduce the next logic block (step 11-7).

Finally, the spare 2 decides if all the logic blocks to be reproduced within the closed disk 22 have been completely reproduced (step 11-8). If part of the logic blocks to be reproduced remains, the spare 2 repeats the steps 11-4 to 11-8. If the logic blocks have been completely reproduced, the spare 2 ends the processing (step 11-9).

The flow of copy processing for the case, where the error frequency has exceeded the threshold in a disk, will be described in detail with reference to FIG. 6 and the flowchart of FIG. 12. FIG. 6 shows the flow of data when the data within a disk unit 20 where the error frequency has exceeded the threshold, is copied into spare disk 21. FIG. 12 shows the flow of the processing which the spare disk 21 makes when it is ordered by the loop control portion 24.

Figure 16:
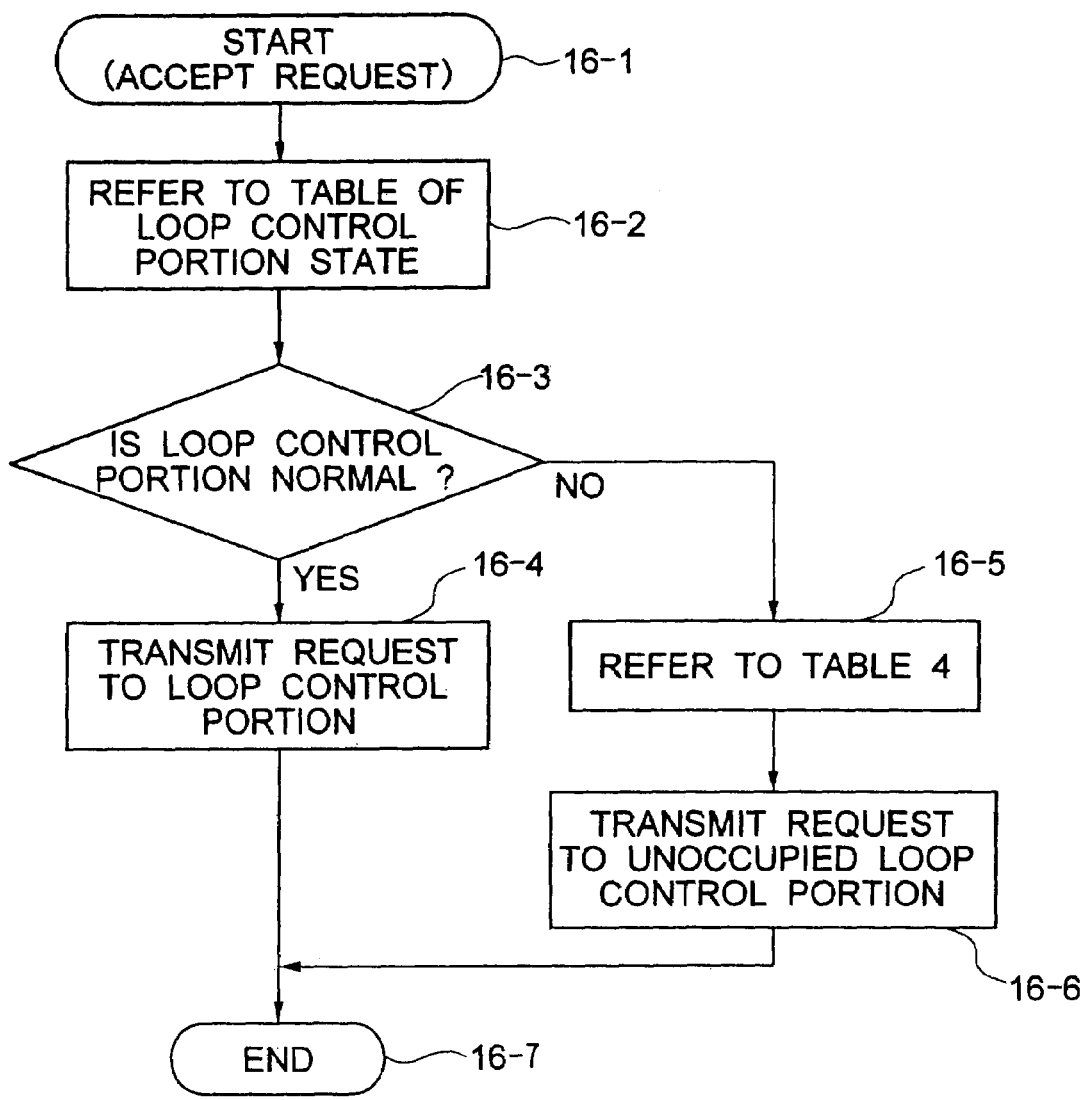
FIG. 16 is a flowchart for the access by alternate loop.

When error occurring a certain number of times over a threshold is detected in disk 22, the loop control portion 2 transmits through loop 2 a command (indicated by ⑦) to the spare 2 that is connected to loop 2 of disk 22, so that the data within disk 22 can be copied into the spare 2 itself. The spare 2 receives this command, and starts the processing shown in FIG. 16 (step 12-1).

When the spare 2 receives the command, the loop control portion 2 and spare 2 are in a relation of initiator and target. After receiving the command, but before starting to execute the command, the spare 2 becomes an initiator to the disk 22. The spare 2, when receiving the command from the loop control portion 2, also receives information about the other disks 21, 2j that belong to ECC group 2 of disk 22 in addition to the information about disk 22 (step 12-2). This former information includes the identifier of disk unit 20 and the identifier of loop 24 to which disk unit 20 belongs.

Then, the spare 2 initializes the value of the address of the logic block which the spare disk 2 itself stores in order that the data from disk 22 can be copied (step 12-3).

In addition, the spare 2 transmits a read command to the disk 22, so that data can be read out from the logic address on the disk 22 (step 12-4).

Thus, data can be transferred not through loop control portion 2 but through loop 2 from disk 22 directly to spare 2. At this time, the spare 2 and disk 22 are in a relation of initiator and target.

Then, the spare 2 decides if this data has been read (step 12-5).

If data has been successfully read out, the spare 2 writes the read data in the logic block of spare disk 2 itself (as indicated by ③) (step 12-8).

If the disk fails to read data, the spare 2 reproduces the data to be written by the method mentioned with reference to FIG. 11, and writes it in the logic block of the spare disk 2 itself. In other words, the spare acquires necessary data for ECC operation of logic block from the ECC group 2 to which disk 22 belongs (step 12-6), and reproduces the data to be written in the logic block of spare 2 (step 12-7).

In addition, the spare 2 writes the obtained data in the logic block of spare 2 itself (as indicated by ⑧) (step 12-8).

Then, the spare 2 updates the address of this logic block in order to copy the next logic block (step 12-9).

In addition, the spare 2 decides if all the logic blocks of disk 22 to be copied have been completely copied (step 12-10).

Figure 13:
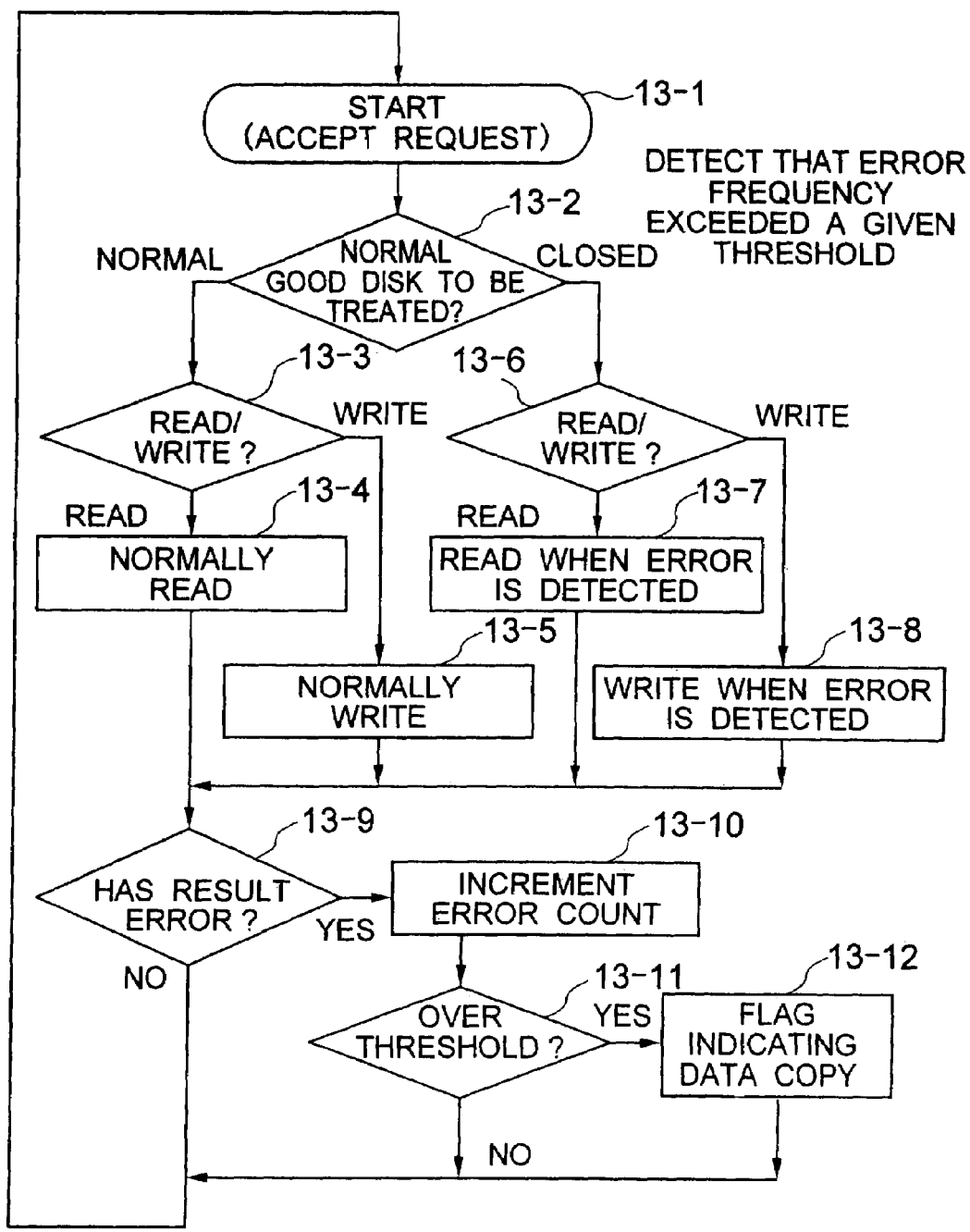
FIG. 13 is a flowchart for reading/writing of data into disk unit.

If part of the logic blocks to be copied remains, the spare 2 repeats the steps 16-4 to 16-10. If all logic blocks to be copied have been copied, the spare 2 ends the processing (step 12-11). The latter job will be described with reference to the flowchart of FIG. 13. This job causes data to be read/written between a certain loop control portion 24 and a disk 20 that is connected to that loop control portion 24 through loop 22. As described above, this job is executed a plurality of times within the loop control portion 24 that acts as an initiator relative to the disk 20. One of the job operations will be described.

A request to read/write data from or in a disk 20 is first generated from the host computer 12 toward the job (step 13-1).

The job decides if the request is with respect to a normal disk unit 20, a closed disk unit 20 or a disk unit where error occurs and is detected a certain number of times over a threshold (including disk unit 20 of which data is being copied into spare disk 21) (step 13-2).

This decision is performed by referring to the disk management table (Table 1) which the control unit 23 has, searching for the status fields with the identification of disk 20 as a key. A flag ordering to write data into spare disk 21 is raised in the status field of a closed disk unit or a disk unit where error occurs and is detected a certain number of times over a threshold.

The case where the disk unit 20 to be requested is normal will be described with reference to FIG. 6. The job generated from the control unit 23 decides if the request is to read or write data (step 13-3).

If the request is to read data, the job makes normal read processing (step 13-4). If, for example, the request is to read data from disk i1, the job transmits a data read command to the disk i1. Then, the disk i1 transfers data through loop 2 to the buffer 1 of loop control portion 1 (as indicated by ①).

If the request is to write data, the job makes normal write processing (step 13-5).

If, for example, the request is to write data in disk 12, the control unit 23 transmits a data write command through loop 2 to disk 12. Then, the buffer 2 of loop control portion 2 transfers data through loop 2 to disk unit 12 (as indicated by ②). In the case of either reading or writing, the loop control portion 1, 2 and disk unit i1, 22 are in a relation of initiator and target.

Figure 14:
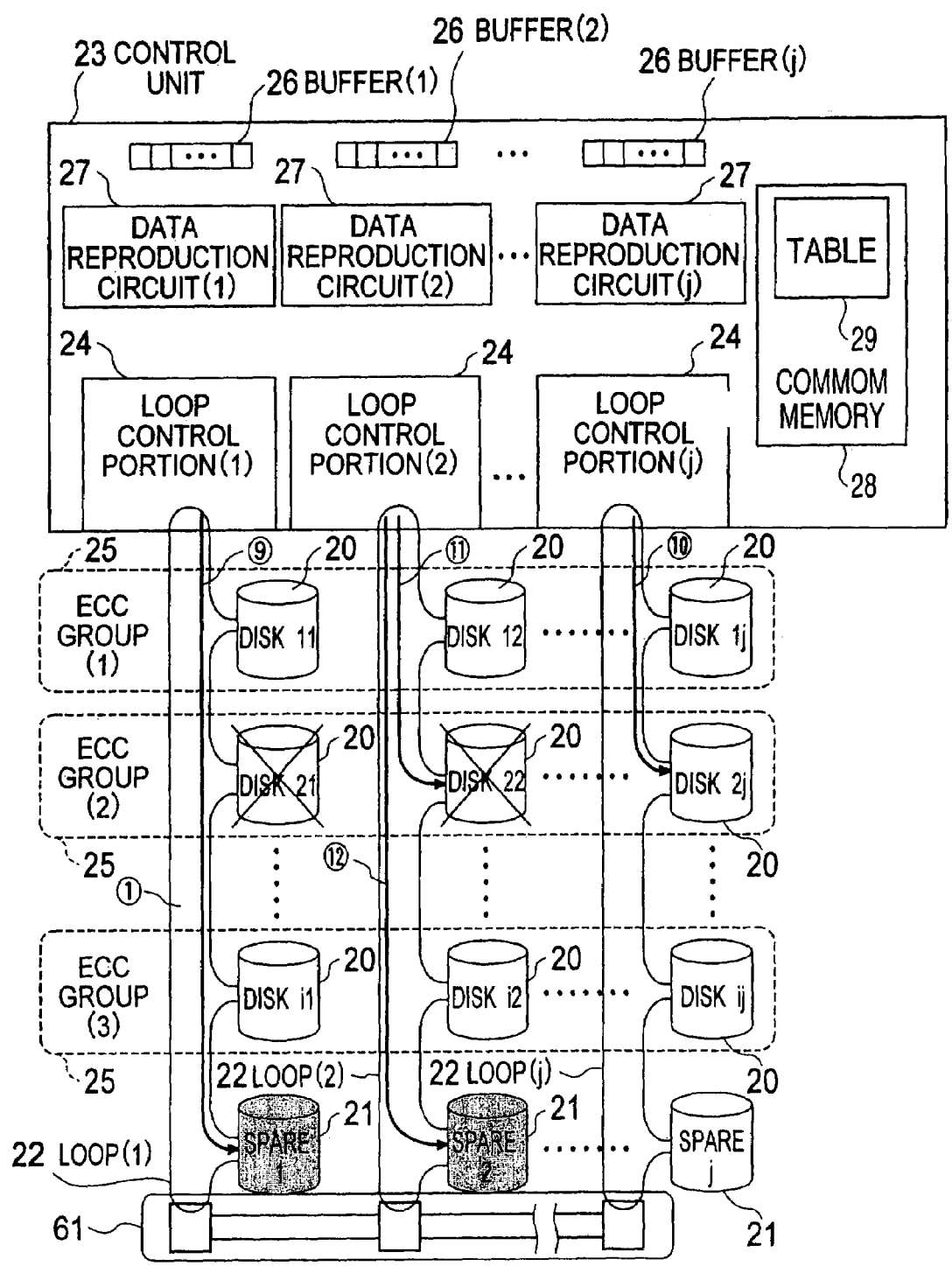
FIG. 14 is a diagram showing the write processing performed when error is detected.

With reference to FIG. 14, a description will be made of the case where the disk unit 20 to which the accepted request is directed is closed or has error occurring and detected a certain number of times over a threshold. In this case, too, the job decides if the request is to read or write data (step 13-6).

If the request is to read data, the job makes read processing at the time of error detection (step 13-7). This processing is the same as that in step 4-7 mentioned in the first embodiment. Also, this processing is made even when the disk unit 20 is closed or even when the disk unit 20 has error occurring and detected a certain number of times over a threshold.

If the request is to write data, the job makes write processing at the time of error detection (step 13-8). The case where the disk unit 20 is closed will be described first. It is assumed that for example disk 21 is closed. The data to be written in disk 21 is written directly in the spare disk 1 that is connected to loop 1 to which the disk 21 belongs (as indicated by ⑨).

At the same time, ECC by which the data written in spare 1 can be processed to reproduce is written in a plurality of normal disk units 20 (disks 2j) that belong to ECC group 2 of disk 21 (as indicated by ⑩).

The case, where the error frequency has exceeded the threshold, will be described. It is assumed that error occurs and is detected in, for example, disk 22 a certain number of times over a threshold. The data to be written in disk 22 is first written in disk 22 (as indicated by ⑪), and immediately thereafter in spare 2 (as indicated by ⑫). The reason why data is written in two disk units in turn is as follows. When data is written in disk 22, there is a possibility that data is being copied into spare 2 from disk 22 where error occurs and is detected a certain number of times over a threshold. Since data is copied into spare 2 as described above, the job on loop control portion 2 cannot know the situation in which the copy is progressing. Therefore, if data is not written in both disk 22 and spare 2, the written data is not recorded on the spare disk 2 in which the finally written data is desired to be kept depending on the timing at which the job has written data. This data mismatching can be prevented by writing data in both disk units.

In addition, the job receives the results of executing the requested read and write operations from the disk units, and decides if the operations have been performed successfully or with error (step 13-9). If no error occurs, the job repeats steps from step 13-1 in order to accept the next request. If error has occurred, the job increments the value of error count of the entry having the corresponding disk identifier on the disk management table illustrated in Table 1 (step 13-10). Then, decision is made of if the incremented result exceeds a predetermined threshold (step 13-11). If it does not exceed the threshold, the job repeats steps from step 13-1 in order to accept the next request. If it exceeds the threshold, a flag instructing to copy data into spare disk is raised at the item indicating the status of the entry having the identifier of the disk 20 on the disk management table (step 13-12).

In addition, since a plurality of loops are mutually connected by the switch 61, communication becomes possible between disk units 20 connected to different loops. The embodiment for this purpose will be described with reference to FIG. 15 and the flowchart of FIG. 16.

TABLE 3

| LOOP ID | STATUS |
|---------|--------|
|         |        |
|         |        |
|         |        |
|         |        |

The control unit 23 employs the state management table shown in FIG. 3 to manage the state of each loop control portion 24 within the control unit 23. Although the loop 2 can operate normally, the access to a loop connected to loop control portion 2 cannot be sometimes made when loop control portion 2 breaks down. In this case, by referring to the state management table of Table 3 at each field, it is possible to see if each corresponding loop control portion is normal or breaks down. The control unit 23, referring to this table 3, accepts a read or write request (step 16-1).

Then, the control unit 23 refers to Table 3 (step 16-2). The control unit checks if the loop control portion 24 of the loop connected to the disk unit 20 that is to undergo read or write operation is normally operating (step 16-3). If the corresponding loop control portion 24 is normally operating, the control unit 23 issues a request to read or write toward the loop control portion 24 that is normally operating (step 16-4). If the loop control portion 24 breaks down (loop control portion 2), the control unit 23 refers to Table 4 showing the number of requests that are waiting for being processed (step 16-5).

TABLE 4

| LOOP ID | NUMBER OF REQUESTS WAITING FOR BEING PROCESSED |
|---------|-----------------------------------------------|
|         |                                               |
|         |                                               |
|         |                                               |
|         |                                               |

Each field of this table has the number of requests to read and write which each loop control portion 24 holds to wait for execution. The loop control portion 1 that is unoccupied and normally operating is used in place of the broken-down loop control portion 2, and accepts the read or write request that was directed to that broken-down loop control portion (step 16-6).

Figure 15:
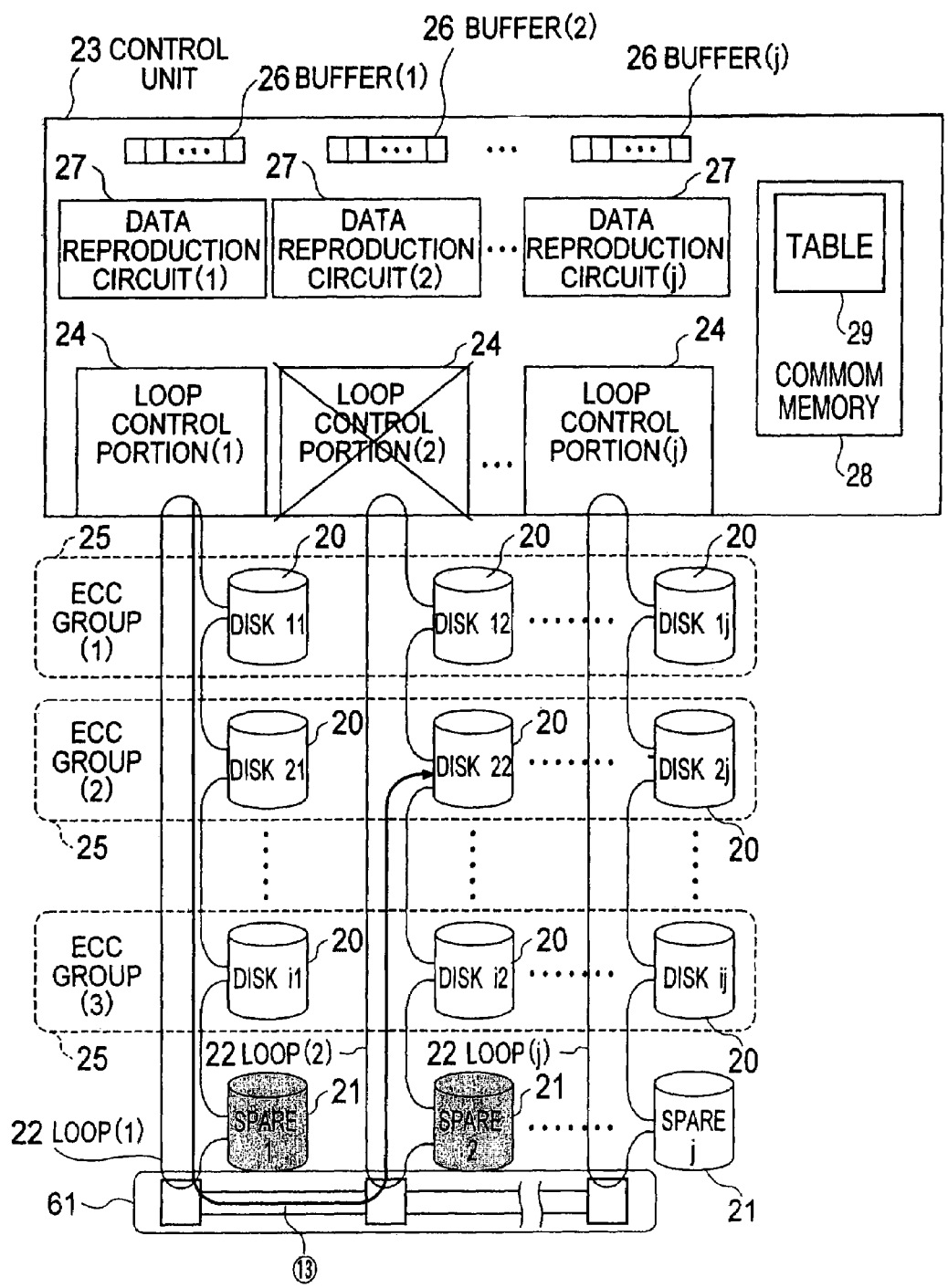
FIG. 15 is a diagram showing the access by alternate loop.

In FIG. 15, it is assumed that a small number of read or write requests are sent to the loop control portion 1 of loop 1. Therefore, the control unit 23 sends the read or write request that was to be processed by the broken-down loop control portion 2 to the loop control portion 1. This request is then sent through loop 1, switch 61 and loop 2 to the disk 22 where read or write operation is to be made (indicated by ⑬).

In this case, the disk 22 to which the request is desired to send is identified by the loop identifier 74 assigned to the loop 22 and the disk unit identifier 75 assigned to disk unit 20 in FIG. 7. In this way, even if a certain control portion 24 breaks down, the request can be sent through another loop control portion 24 and switch 61, and thus it is possible to make access to the disk unit 20 connected to loop 22 that is connected to the broken-down loop control portion 24.

Thus, according to the present invention, when data is copied into a spare disk from a disk unit where error occurs and is detected a certain number of times over a threshold or from a closed disk unit, a minimum number of the resources such as a microprocessor and memory provided on a control unit are assigned to this processing, thus preventing the disk array from being deteriorated in its performance during the copying process.

What is claimed is:

1. A disk array comprising:

a plurality of Error Correction Code (ECC) groups each including a plurality of disks;

a group of spare disks, each spare disk serving as a spare for at least one disk of said ECC groups;

a first control unit, to be coupled to a host unit, for controlling input and output between said host unit and a cache memory; and a second control unit, coupled to said disks and said spare disks, for controlling input and output between said cache memory, said disks and said spare disks, wherein said second control unit includes a plurality of loop control portions each being connected to a fibre channel loop which is connected to one of the disks of said ECC groups, wherein data of a disk of one ECC group, connected to one fibre channel loop, can be recovered using data of another disk of said one ECC group, connected to another fibre channel loop, wherein each fibre channel loop, which is connected to one of the loop control portions, is connected to at least one spare disk, wherein each loop control portion of the second control unit performs copying of data stored in a first disk of the disks, which is connected to a first fibre channel loop, into a spare disk connected to said first fibre channel loop which is connected to the first disk of the ECC group when errors in said first disk exceeds a predetermined threshold, and wherein when the first disk fails, a loop control portion of the plurality of loop control portions performs processing of a read request from a host unit by recovering the data of the first disk based on data read out from at least a second disk which is a disk other than the first disk included in the same ECC group which includes the first disk, the second disk being connected to a second fibre channel loop, which is a fibre channel loop other than the first fibre channel loop connected to the first disk, and transmits the recovered data to said host unit.

2. The disk array according to claim 1, wherein said copying and said processing of the read request are performed at a same time.

3. The disk array according to claim 2, wherein said data of said disk of said one ECC group is recovered using said data of said another disk of said one ECC group when disk of said one ECC group fails.

4. The disk array according to claim 1, wherein data transfer speed in each fibre channel loop is higher than data transfer speed in each of said disks of said ECC groups.

5. The disk array according to claim 1, wherein when the loop control portion performs processing of a write request from a host unit, upon performing copying of data from the first disk connected to said same fibre channel loop into the spare disk, and if the data in an address subjected to said write request has not been copied into the spare disk, data relating to said write request is written into the first disk from which said copying of data into the spare disk is made, and if the data in said address subjected to said write request has been copied into the spare disk, data relating to said write request is written into the spare disk to which said copying of data from the disk is made.

6. A disk array comprising:
   a plurality of ECC groups each including a plurality of disks;
   a group of spare disks, each spare disk serving as a spare for at least one disk of said ECC groups;
   a first control unit, to be coupled to a host unit, for controlling input and output between said host unit and a cache memory; and
   a second control unit, coupled to said disks and said spare disks, for controlling input and output between said cache memory, said disks and said spare disks,
   wherein said second control unit includes a plurality of loop control portions each being connected to a fibre channel loop which is connected to one of the disks of said ECC groups,
   wherein data of a disk of one ECC group, connected to one fibre channel loop, can be recovered using data of another disk of said one ECC group connected to another fibre channel loop,
   wherein each fibre channel loop, which is connected to one of the loop control portions, is connected to at least one spare disk,
   wherein said data of said disk of said one ECC group connected to said one fibre channel loop is recovered using said data of said another disk of said one ECC group connected to said another fibre channel loop, when said one fibre channel loop fails,
   wherein each loop control portion of the second control unit performs copying of data stored in a first disk of the disks, which is connected to a first fibre channel loop, into a spare disk connected to said first fibre channel loop which is connected to the first disk of the ECC group when errors in the first disk exceeds a predetermined threshold, and
   wherein when the first disk fails, a loop control portion of the plurality of loop control portions performs processing of a read request from a host unit by recovering data of the first disk based on data read out from at least a second disk which is a disk other than the first disk included in the same ECC group which includes the first disk, the second disk being connected to a second fibre channel loop which is a fibre channel loop other than the first fibre channel loop connected to the first disk, and transmits the recovered data to said host unit.

7. The disk array according to claim 6, wherein upon detection of a failure of said one fibre channel loop a switching is conducted from said one fibre channel loop to said another fibre channel loop.

8. The disk array according to claim 6, wherein when the loop control portion performs processing of a write request from a host unit, upon performing copying of data from the first disk connected to said same fibre channel loop into the spare disk, and if the data in an address subjected to said write request has not been copied into the spare disk, data relating to said write request is written into the first disk from which said copying of data into the spare disk is made, and if the data in said address subjected to said write request has been copied into the spare disk, data relating to said write request is written into the spare disk to which said copying of data from the first disk is made.

9. A disk array comprising:
   a plurality of Error Correction Code (ECC) groups each including a plurality of disks;
   a first control unit, to be coupled to a host unit, for controlling input and output between said host unit and a cache memory; and
   a second control unit coupled to said disks and a plurality of spare disks for controlling input and output between said cache memory and said disks and said spare disks,
   wherein said second control unit is coupled to a plurality of fibre channel loops each being connected to one of the disks of each of the ECC groups,
   wherein data of a disk, of one ECC group, connected to one fibre channel loop, can be recovered using data of another disk, of said one ECC group connected to another fibre channel loop,
   wherein a loop control portion included in the second control unit performs copying of data stored in a first disk of the disks, which is connected to a first fibre channel loop, into a spare disk connected to said first fibre channel loop which is connected to the first disk of the ECC group when errors in the first disk exceeds a predetermined threshold, and
   wherein when the first disk fails, another loop control portion performs processing of a read request from a host unit by recovering data of the first disk based on data read out from at least a second disk which is a disk other than the first disk included in the same ECC group which includes the first disk, the second disk being connected to a second fibre channel loop which is a fibre channel loop other than the first fibre channel loop connected to the first disk, and transmits the recovered data to said host unit.

10. The disk array according to claim 9, further comprising:
    a group of spare disks, each spare disk serving as a spare for each disk of said ECC groups,
    wherein said second control unit, being coupled to said each spare disk of said spare disks, controls input and output between said cache memory and said each spare disk.

11. The disk array according to claim 10, wherein data transfer speed in each fibre channel loop is higher than data transfer speed in each of said disks of said ECC groups.

12. The disk array according to claim 10, wherein a status of each fibre channel loop is monitored by said second control unit.

13. The disk array according to claim 10, wherein upon detection of a failure of said one fibre channel loop a switching is conducted from said one fibre channel loop to said another fibre channel loop.

14. The disk array according to claim 9, wherein said second control unit includes a plurality of said loop control portions each being connected to one of said fibre channel loops connecting one of the disks of one of the ECC groups.

15. The disk array according to claim 9, wherein data of each of said disks of said one ECC group is recovered using data of said another disk of said one ECC group when said data of said disk of said one ECC group fails.

16. The disk array according to claim 9, wherein data of each of said disks of said one ECC group connected to said one fibre channel loop is recovered using data of said another disk of said one ECC group, connected to said another fibre channel loop, when said one fibre channel loop fails.

17. The disk array according to claim 9, wherein when the loop control portion performs processing of a write request from a host unit, upon performing copying of data from the first disk connected to said same fibre channel loop into the spare disk, and if the data in an address subjected to said write request has not been copied into the spare disk, data relating to said write request is written into the first disk from which said copying of data into the spare disk is made, and if the data in said address subjected to said write request has been copied into the spare disk, data relating to said write request is written into the spare disk to which said copying of data from the first disk is made.

* * * * *